(12) United States Patent
Brummer

(10) Patent No.: US 6,898,302 B1
(45) Date of Patent: May 24, 2005

(54) SYSTEMS, METHODS AND COMPUTER PROGRAM PRODUCTS FOR THE DISPLAY AND VISUALLY DRIVEN DEFINITION OF TOMOGRAPHIC IMAGE PLANES IN THREE-DIMENSIONAL SPACE

(75) Inventor: Marijn E. Brummer, Atlanta, GA (US)

(73) Assignee: Emory University, Atlanta, GA (US)

( * ) Notice: Subject to any disclaimer, the term of this patent is extended or adjusted under 35 U.S.C. 154(b) by 0 days.

(21) Appl. No.: 09/576,113

(22) Filed: May 22, 2000

Related U.S. Application Data
(60) Provisional application No. 60/135,368, filed on May 21, 1999.

(51) Int. Cl.[7] ................................................ G06K 9/00
(52) U.S. Cl. ...................................................... 382/131
(58) Field of Search ................................ 382/128, 131, 382/154, 285, 293, 296, 132; 345/427; 378/4, 15, 901

(56) References Cited
U.S. PATENT DOCUMENTS

| | | | |
|---|---|---|---|
| 4,674,046 A | | 6/1987 | Ozeki et al. |
| 4,984,157 A | * | 1/1991 | Cline et al. ................. 345/424 |
| 5,765,561 A | * | 6/1998 | Chen et al. ................. 600/407 |
| 5,891,030 A | | 4/1999 | Johnson et al. |
| 5,946,370 A | * | 8/1999 | Adler et al. .................... 378/4 |
| 6,151,404 A | * | 11/2000 | Pieper ......................... 382/128 |
| 6,396,897 B1 | * | 5/2002 | Ebrahimifard et al. ......... 378/4 |

FOREIGN PATENT DOCUMENTS

EP       0 365 141 A       4/1990

OTHER PUBLICATIONS

"A Dynamically Adaptive Imaging Algorithm for Wavelet–Encoded MRI" Magnetic Resonance in Medicine, Academic Press, Duluth, MN; vol. 32, No. 6; Dec. 1, 1994; pp. 738–748, XP000497997; ISSN: 0740–3194; p. 743, right hand column, line 5; p. 744, left–hand column, line 51.
"Enhanced Visualization of Angiograms Using 3D Models" *Medical Imaging 1999: Image Display*, San Diego, California, Feb. 21–23, 1999, vol. 3658, pp. 90–98; XP000955682 Proceedings of the SPIE—The International Society for Optical Engineering, 1999, SPIE–Int. Soc. Op. Eng.; ISSN: 0277–786X; p. 97, lines 5–10; figure 4.

* cited by examiner

*Primary Examiner*—Leo Boudreau
*Assistant Examiner*—Tom Y. Lu
(74) *Attorney, Agent, or Firm*—Alston & Bird LLP

(57) ABSTRACT

Apparatuses, methods and computer program products for scan plane geometry definition in tomographic data acquisition via an interactive three-dimensional (3-D) graphical operator interface. The apparatuses, methods and computer program products are initially proposed for use in cardiac MRI, but have a much broader area of application. The apparatuses and methods utilize 3-D computer graphics aspect views of slice planes to show a new scan, represented as semi-transparent uniformly-colored planes. Intersections of these planes with opaque texture-mapped gray-level views of previously acquired images enable the orientation of a new scan to be viewed in a much more intuitive fashion. Advantageously, the apparatuses and methods of the present invention provide for more efficient elimination of positional ambiguity that is often associated with conventional 2-D intersection line views. In addition, any misregistration between localizer scans can be detected immediately in the integrated 3-D display by misalignment of anatomy in the previously acquires image planes.

21 Claims, 7 Drawing Sheets

(a) (b)

SYSTEMS, METHODS AND COMPUTER PROGRAM PRODUCTS FOR THE DISPLAY AND VISUALLY DRIVEN DEFINITION OF TOMOGRAPHIC IMAGE PLANES IN THREE-DIMENSIONAL SPACE

CROSS REFERENCE TO RELATED APPLICATION

This application claims priority to and the benefit of the filing date of provisional application entitled "Methods for Display and Visually Driven Definition of Tomographic Image Planes in Three-Dimensional Space," assigned Ser. No. 60/135,368 and filed May 21, 1999, which is hereby incorporated by reference.

FIELD OF THE INVENTION

The present invention generally relates to 3-dimensional tomographic imaging, and more particularly, to systems, methods and computer program products facilitating the display and visually driven definition of tomographic image planes in three-dimensional space.

BACKGROUND OF THE INVENTION

Tomographic imaging involves the acquisition of data that depict a map of some physical features along cross-sections through a volume in three-dimensional space. Tomography is a technique for generating images of a predetermined plane section of a solid object while blurring out the images of other planes. Several imaging modalities, most notably ultrasound imaging and magnetic resonance imaging (MRI), allow acquisition of such cross-sections in any desired orientation. This capability is highly desirable in a range of medical imaging applications, in which preferred image orientations exist for optimal diagnostic or other use of the image data. However, the preferred orientation and location of the image planes are in many cases not easily determined by analysis of external landmarks on the body to be imaged, and must be determined through feedback from initial images acquired within the study. The process of arriving at the desired scan geometry is in many applications a widely recognized difficult problem.

It is noted at this point that the present discussion is primarily directed to the prior art as it exists in the field of MRI, though it will be appreciated by those of ordinary skill in the art that other imaging modalities, such as ultrasound imaging, would benefit from the invention as described herein.

Scan geometry definition in MRI scanners is performed by encoding electronically controlled spatial components of pulsed electromagnetic fields in all three dimensions in such a manner that a desired spatial and temporal excitation pattern of nuclear magnetic spins is achieved. A sequence of radio-frequency signals, emitted in response by the nuclear spins, is captured by one or more receiver coils, digitized, and fed into a computer, where it is reconstructed into an image that reflects the spatial distribution of one or more features of the spin excitations. During this process, operator control over the geometry of the tomographic two-dimensional (2-D) plane or planes, of three-dimensional (3-D) volume, typically exists in modification of the associated parameters that govern the pulse sequence to reflect the desired geometry.

The size and the complexity of the parameter set prohibit in most instances control through direct modification of numerical values alone. Current MRI scanners provide geometry control through a visual interface by showing the operator the location of the anticipated scan in relation to images acquired earlier in the same study. To accommodate this, scanners typically allow the operator to rapidly acquire a limited number of initial images with predetermined suboptimal geometry at the beginning of the study. One or more of these localizer images (also referred to as scout images or reference images) may then be displayed on the computer screen, with intersection lines as overlay graphics depicting the anticipated location and orientation of the next scan while it is being defined. Either visual feedback of parameter changes is obtained by changes in position and orientation of these intersection lines, or the operator may actively interact with the intersection lines on the computer screen through pointer device manipulation, upon which the associated parameter changes are processed by the computer. A combination of these methods is the current state of the art.

Prior art generally defines a scan plane through intersecting lines on a 2-D tomographic localizer image display. The scan plane is defined through a line located on the 2-D image, and perpendicular to the displayed image, as shown in FIG. 1, which is discussed in more detail below. A shortcoming of this approach is that in cases with multiple non-orthogonal localizer images, the scan plane no longer can be defined perpendicular to the displayed images. In such situations the mental picture of the plane location tends to lose intuitiveness, and operator interactions to control the plane location in one image, through moving or rotating the definition lines, often have unexpected results in the other localizer planes. This can make plane definition a difficult iterative process. The proposed invention restores a desired level of intuition to this process.

A similar methodology is commonly employed in situations where a tomographic data volume has already been acquired with high resolution in three dimensions, but in a view plane orientation not properly aligned with the anatomy of interest. This situation presents itself sometimes in MRI, and often in X-ray Computed Tomography (CT), a modality with much more limited options in acquisition plane orientation. In such cases the geometry should be defined for a re-slicing or reformatting of the data volume to achieve the desired viewing plane, instead of for actual data acquisition along a plane.

These and other limitations of the current state of the art thus result in an iterative and often non-intuitive and confusing process to arrive at double-oblique image planes whenever these planes are required. Double-oblique planes are defined in this context as image planes that have no in-plane directions in common with the reference views. Single-oblique views, that have one common axis with a scout image, are completely defined by the common axis, displayed as an intersection line in the reference image, and its other axis, known to be perpendicular to the reference plane. Such a situation, as illustrated in FIG. 1, provides a certain level of intuitive understanding to the observer of these views. In the case of double-oblique intersections, it is no longer possible to assume that the plane represented by the intersection line is always orthogonal to the viewing plane. In such case, the observer must rely on simultaneous viewing of multiple reference views to mentally construct the geometry, also understanding and taking into account the geometrical relation between the reference views themselves. Interaction with the geometry definition by moving intersection lines in one reference view brings about changes in the intersection of the new plane geometry in other reference views that are often undesired and difficult to understand. Such undesired changes are then compensated by moving the intersection back to its intended location or orientation in the other reference view, possibly resulting in a confusing and time-consuming iterative process that does not always converge to the desired geometry.

As will be appreciated by those of skill in the art, another shortcoming of the prior art is in its failure to deal appropriately with cases where misregistration occurs between subsequently acquired localizer scans. In particular, this problem has been observed in cardiac MRI scans, and may be associated with many possible sources of patient motion that may cause such misregistration. Side-by-side display of localizer images with intersection line graphics depicting the geometry of a desired scan geometry does not provide any information that helps the operator detect spatial misregistration between these localizer images. As a result, efforts to align the operator defined scan geometry with all desired anatomical landmarks in the localizer scans may fail, or, even worse, be perceived as successful but result in acquisitions in the wrong location or orientation.

Thus, there exists an unsatisfied need in the industry for visualization technology able to alleviate these and other problems in 3-D visualization.

SUMMARY OF THE INVENTION

The present invention provides graphical operator interface methodologies that provide a solution to the problems discussed above through use of 3-D visualization technology. According to the present invention, points in relevant portions of 2-D images, such as greyvalue MRI images, of one or more localizer scans are transformed to their original location in 3-D space and displayed in an aspect view in 3-D perspective or parallel projection, retaining the graylevel- or color-coded intensity values used in 2-D views. The 3-D display may be updated in real-time to show dynamics of the anatomy, such as in cardiac applications where there are dynamics of the physical feature to be imaged or observed. Color hints such as edge decorations or modulation of the hue in graylevels may be provided to the viewer to help the operator distinguish between multiple simultaneously displayed scans. The display of individual parallel slices in a multi-slice reference scan may be interactively controlled in order to visualize only important anatomical landmarks. Furthermore, using the present invention, a virtual camera position can be changed in real-time to view the subject (e.g., anatomy) to any desired aspect.

According to one embodiment of the invention, there is disclosed an apparatus for facilitating the display and visually driven definition of tomographic image planes of a subject in three-dimensional (3-D) space. The apparatus includes an imaging device for acquiring one or more plane images of the subject, a 3-D model device, in communication with the imaging device, for generating a 3-D model based upon the one or more plane images acquired from the imaging device, and an input device for receiving operator input, wherein the operator input defines an operator defined plane, and wherein a model of the operator defined plane is incorporated into the 3-D model. Additionally, the apparatus includes a display for presenting the 3-D model, wherein the 3-D model includes the operator defined plane, such that the operator can determine the orientation of the operator defined plane in relation to the one or more plane images acquired from the imaging device.

According to one aspect of the invention, the apparatus also includes a scan geometry module that communicates with the input device to receive the operator input, wherein the scan geometry generates scan geometry parameters representative of the operator input and communicates the scan geometry parameters to the imaging device such that the imaging device can acquire the operator defined plane.

According to another aspect of the invention, the 3-D model device updates the 3-D model to include the acquired operator defined plane. The input device can also enable the operator to define a new operator defined plane after the 3-D model has been updated to include the previously acquired operator defined plane. Furthermore, the 3-D model device can include a scan model, for receiving the scan geometry parameters, and a subject model, for receiving image data from the imaging device.

According to yet another aspect of the invention, the imaging device is selected from one of the group consisting of a magnetic resonance imaging (MRI) scanner and an ultrasound machine. Additionally, according to the invention, the input device enables the operator to alter the orientation of the operator defined plane in the 3-D model, such that the operator can interactively manipulate and view, via the display, the defined plane in the 3-D model to facilitate the determination of a desired operator defined plane.

According to another embodiment of the invention, there is disclosed a method for enabling the interactive modification of operator defined scan geometry in an imaging system. The method includes storing image planes, acquired from an imaging device, as image data, transmitting the image data to a 3 dimensional (3-D) model device, wherein the 3-D model device constructs a 3-D model based on at least a portion of the image data, displaying the 3-D model to the operator, and enabling the operator to manipulate the 3-D model to define an operator defined image, wherein an object representing the operator defined image is presented with the 3-D model, such that the operator can determine the orientation of the operator defined image in relation to the one or more image planes acquired from the imaging device.

According to one aspect of the invention, the method also includes acquiring the operator defined image based upon inputs received from the operator, and updating the 3-D model to include the operator defined image. Furthermore, the method can include querying the operator for input to enable the operator to define a new operator defined image to be generated. Additionally, the method can include allowing the operator to manipulate the updated 3-D model.

According to another aspect of the invention, the method includes querying the operator for input to enable the operator to manipulate the object representing the operator defined image, such that the user can interactively manipulate the object representing the operator defined image in the 3-D model to facilitate the determination of a desired operator defined image.

According to yet another embodiment of the invention, there is disclosed a computer program product for use with a data processing system for facilitating the display and visually driven definition of tomographic image planes in three-dimensional (3-D) space. According to the present invention, the computer program product includes a computer usable medium having computer-readable code means embodied in said medium, said computer-readable code means including computer-readable code means for storing localizer images, acquired from an imaging device, as image data, computer-readable code means for constructing a 3-D model based on at least a portion of the image data, computer-readable code means for transmitting the 3-D model to a display for displaying the 3-D model to the operator, and computer-readable code means for enabling the operator to manipulate the 3-D model to define an operator defined image to be generated.

According to one aspect of the invention, the computer program product further includes computer-readable code means for updating the 3-D model to include the operator defined image. Additionally, the computer program product can further include computer-readable code means for querying the operator for input to enable the operator to manipulate the updated 3-D model. Moreover, the computer program product can further include processing instructions for querying the operator for input to enable the operator to define a new operator defined image.

Within the 3-D aspect view of one or more reference images, the geometry of a new scan, as defined before acquisition at any time by a current set of scan parameters, can be displayed through graphics. Such graphics may include semi-transparent visualizations of the actual scan plane, or opaque lines indicating the intersections of the new scan plane with the planes of the reference images, or a combination of these and other visuals. Operator interactions to change the location of the new scan plane relative to the anatomy, to which the reference images provide visual cues, are different for different image modalities. In ultrasound imaging this plane is naturally defined by the location of the typically hand-held transmitter probe at the outside surface of the imaging subject. In contrast, other modalities such as MRI rely on pointer device interactions or special-purpose 3-D equivalents of such to initiate such operator actions. In both situations the changes in scan geometry are immediately visualized through updates in the displayed computer graphics, allowing the operator the visual feedback required to terminate the interaction when the desired scan geometry, or the geometry features modified by the interaction, is reached. Furthermore, updates of the scan geometry may be implemented as changes in graphics depicting the new scan geometry while graphics representing reference views remain static, or vice versa.

It will be appreciated that in relation to the prior art using intersection line graphics in 2-D views, the present invention offers several improvements. First, the integrated 3-D view of multiple reference images implemented by the present invention offers a much easier and more comprehensive understanding of the geometry of the new scan in relation to the anatomy as visualized by these reference images than do multiple 2-D views alone. Secondly, a 3-D scene allows an operator to interactively and immediately modify the plane orientation of a new scan in a desired direction, versus the iterative approach utilizing 2-D views where plane orientation changes can only be effectuated through rotations within the visualized 2-D viewing plane. Third, possible misregistration between multiple reference images, as may occur from unintended patient movement during the study, are easily detected in the 3-D view as a mismatch of anatomy at the intersection of the reference image visualization graphics. This allows the operator to take appropriate action to compensate for these phenomena, while the use of 2-D reference views alone would in many cases escape such detection, possibly resulting in acquisition scans of erroneous geometry.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
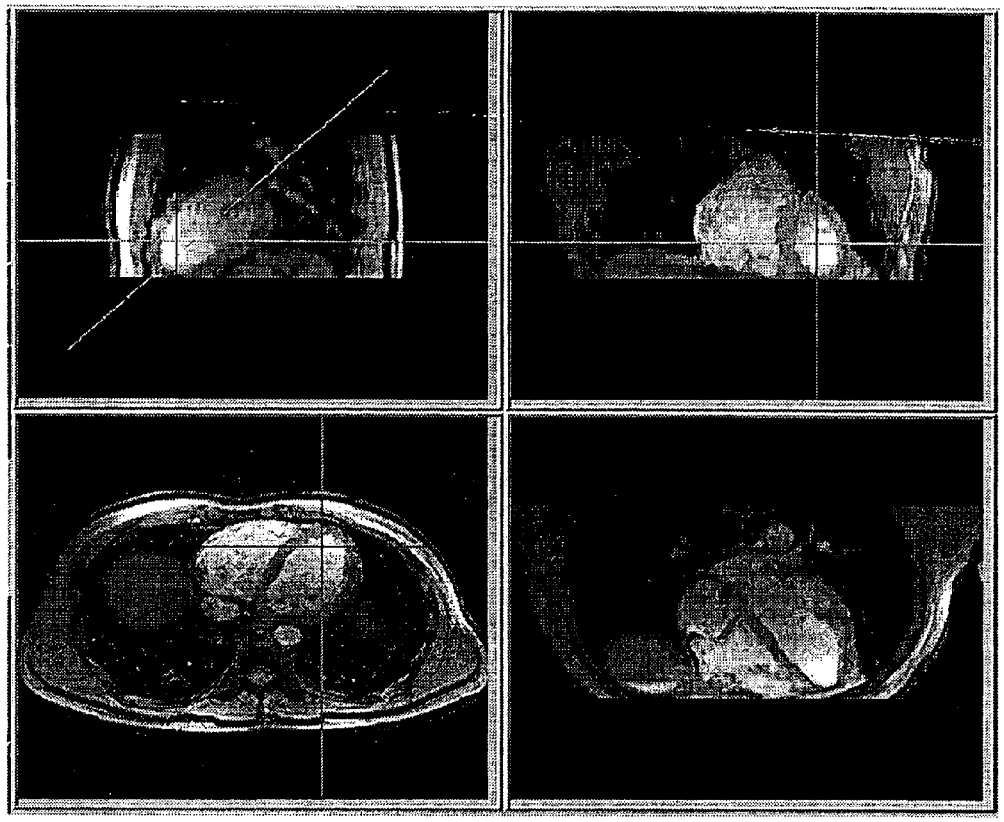
FIG. 1 shows three localizer images displayed on a screen with intersection lines as overlay graphics depicting the anticipated location and orientation of the next scan, and the geometry of a new image, according to the prior art.

FIG. 1 shows three localizer images displayed on a screen, where the images include intersection lines as overlay graphics depicting the anticipated location and orientation of the next scan, and the geometry of a new image, according to the prior art. The geometry of a new image, shown in the lower right corner, is defined by editing intersection line graphics in one or more existing views. This approach is used both in image reformatting, illustrated in FIG. 1, and for scan plane definition during data acquisition. FIG. 1 shows an illustrative example of this prior art approach in the context three 2-D images showing slices of a heart. The lower right image shows the definition of a plane depicting an angled coronal four-chamber view through the heart, generated from a stack of transaxial slice images and intersection line graphics, illustrated in the lower left image. Also illustrated in the upper left image is a sagittal view, and in the upper right image, a coronal view.

It will be appreciated with reference to FIG. 1 the difficulty presented by using 2-D line graphics to generate a desirable scan geometry. In utilizing conventional 2-D line graphics, operator selection of a plane location tends to lose intuitiveness. Furthermore, operator interactions to modify the plane orientation of a plane in one image, through moving or rotating the definition lines, often have unexpected results in the other localizer planes. This can make plane definition a difficult iterative process. Because a similar prior art methodology is commonly employed in situations where a tomographic data volume has already been acquired with high resolution in three dimensions, but in a view plane orientation not properly aligned with the anatomy of interest, similar problems result. One purpose of the present invention is to alleviate the problems of prior art visualization tools by offering a flexible and relatively low-cost solution offering a realistic dynamic 3-D anatomical perspective.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

The present invention comprises systems, methods and computer program products which enable visualization and interactive pre-acquisition definition of the geometry of a tomographic scan in reference to one or more existing tomographic projections of the subject matter to be imaged. Although it should be appreciated that the present invention will be referred to herein with respect to its implementation using an MRI or similar imaging device that generates images of the anatomy, the present invention is not intended to be limited to these embodiments. Rather, the present invention can be utilized to enable visualization and interactive pre-acquisition definitions of scans of virtually any subject matter performed by any capable imaging device. For instance, acquisition of image data may occur by an imaging device such as an MRI or ultrasound scanner that is capable of generating tomographic maps of certain physical quantities across a volume of interest, or may occur by computer processing of previously acquired data volumes. The latter occurrence can be referred to as reformatting (or reslicing), while acquisition (or scan) may be used to refer to data generation by the imaging device.

Figure 2:
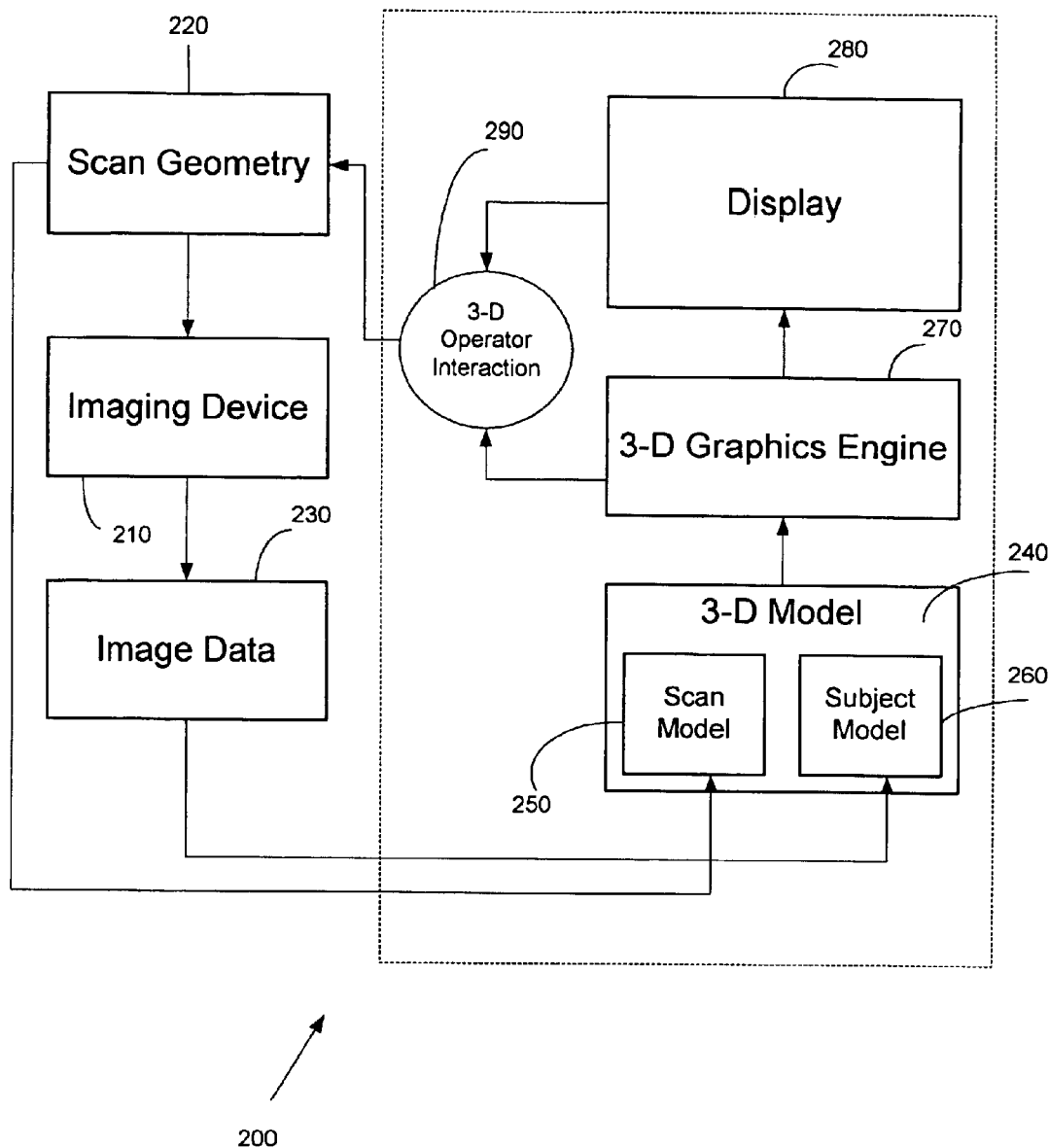
FIG. 2 illustrates a block diagram of an interactive scan geometry definition (ISGD) system of the present invention, according to one aspect of the present invention.

FIG. 2 illustrates a block diagram of an Interactive Scan Geometry Definition (ISGD) System 200 according to the present invention. The ISGD System 200 integrates the use of 3-D computer graphics methods to overcome widely recognized shortcomings of the prior art, some of which are discussed in the Background of the Invention. The primary components of the present invention, comprising hardware, software, or a combination thereof, as discussed above, are identified in FIG. 2 as being within the box illustrated with dotted lines. A primary purpose of the ISGD System 200 system is to enable the interactive 3-D definition of imaging planes for a tomographic imaging device 210. The imaging device 210 may be an actual imaging device, such as an MRI scanner or an ultrasound scanner, that makes observations of some physical aspects of a sample or subject (referred to as sample hereinafter). Alternatively, the imaging device 210 may represent a virtual imaging device, such as a computer, that generates new images by processing pre-stored image data without performing further physical observations. Data collected from the imaging device 210 can be transferred using DAT tape, Ethernet network connection or the like to the hardware and software of the present invention. Regardless of the particular imaging device 210 used in the ISGD System 200, the imaging device 210 will typically possess limited knowledge about the location and size of a sample to be imaged.

The imaging device 210 will typically rely on inputs from the operator to determine how the scan planes must be optimally positioned for any desired purpose. As will be described in detail below, operator-supplied inputs identifying the position of a desired scan geometry are received and parsed by one or more processors into a definition of a set of scan geometry parameters, stored in software. These parameters are stored within a scan geometry module 220 and define the geometry necessary to drive the imaging device 210 in the acquisition of image data. The image data generated by the imaging device 210 is stored in one or more image data databases 230. It will be appreciated by those of ordinary skill in the art that other parameters, in addition to those related to scan geometry, are typically required for a complete scan definition. Nevertheless, these additional parameters are usually dependent upon the type of imaging device 210, and thus, are not considered herein as they are insignificant to the description and scope of the present invention. Further, these additional parameters will be appreciated by one of ordinary skill in the art.

Operator inputs for scan geometry definition are typically initiated in response to visual cues provided by a display 280, which typically comprises a cathode ray tube or liquid crystal display (LCD) screen. The operator inputs define a desired image orientation to allow interactive and immediate modification of an image plane the operator wishes to view. The operator interactions or inputs can be accomplished via any conventional input device, such as a mouse or keyboard, in communication with a processor for receiving the operator interactions. These inputs are received by the 3-D operator interaction module 290, which is in communication with the operator input device(s). The operator inputs may be manipulated by one or more processors located within the 3-D operator interaction module 290, or within the scan geometry module 220, such that the imaging device 210 will recognize and accurately interpret the operator inputs as requesting a particular scan geometry. Typically, operator interactions involve point-and-click actions with a mouse device that are parsed into changes in the scan geometry. According to one aspect of the invention discussed in detail below, the operator can visually locate in 3-D space a plane to be viewed. Furthermore, the operator defined plane may be superimposed over multiple scans generated by the imaging device 210 and represented in a composite 3-D presentation such that the operator can easily determine the location of the plane to be scanned. The operator interactions can be viewed on the display 280, such that the operator can view in real time the planned scan geometry.

A 3-D Model device 240, in communication with the scan geometry module 220, receives at a scan model 250 the scan geometry parameters representing the operator's input scan geometry in a 3-D scene, generated by the scan geometry module 220 in response to operator interaction. The 3-D Model device also includes an subject model 260 that represents anatomical locations and landmarks derived from the image data stored in the image data database 230 and received from the imaging device 210. The 3-D Model device collects image data and scan geometry and forms 3-D objects models representing each such that an operator can view an image of the scanned subject matter in conjunction with a desired scan geometry. It will be appreciated that the generation of the 3-D model can be performed according to well known 3-D rendering software. The 3-D model is then fed into a 3-D graphics engine 270, which continuously updates an aspect view projection image and transfers the image to a 3-D display 280.

The 3-D graphics engine 270 may be embodied by standard video graphics hardware. Alternatively, the 3-D graphics engine can include software for performing some of 3-D modeling functions of the 3-D Model device 240. Using well-known hardware-acceleration technology for surface rendering and texture mapping, the 3-D graphics engine 270 can be implemented using conventional computer equipment. Preferably, the 3-D graphics engine 270 achieves sufficient performance to allow fully interactive manipulation of objects in a 3-D view while preserving the full spatial resolution of images received from the imaging device 210, such as gray level images. This can be contrasted with the generation of 2-D graphics in prior art systems, which can use overlay graphics on top of displayed pre-acquired scout images to indicate the modeled intersections of slice planes in a planned scan geometry. Furthermore, it should be appreciated by those of skill in the art that the 3-D graphics engine 270 of the present invention is capable of rendering time-resolved data with the same performance as static scenes by cycling through a sequence of models, each of which contain a temporal frame of the dynamic scene. This feature may be particularly beneficial, for example, in cardiac imaging applications.

Operator interactions received by the operator interaction module 290 to define a desired scan geometry may involve manipulation of the objects representing the scan model, such as an illustrated plane. For example, through the manipulation of a mouse or like input device, the scan model objects may be rotated or translated in directions within the viewing plane. Where an MRI scan of a slice is represented by a object model displaying the scan as a plane in a 3-D presentation, a scan model illustrated as a plane may be orientated by the user such that the plane can be rotated and moved in multiple directions in the 3-D presentation.

Furthermore, scan model objects may be moved in and out of the viewing plane (i.e., zoom). If this is done while the subject matter is in a fixed location in the view, these interactions can be parsed into changes in scan geometry. Such changes are then updated in the display to visually confirm the effect of the operator interaction.

According to another aspect of the invention, geometry differentials may be parsed from interactions affecting the subject model objects, rather than the scan model objects. This may occur while the scan geometry model fixed relative to the camera such that movement of the scan model objects change the orientation of the desired scan geometry. Additional operator interactions with the 3-D graphics scene may be required, for example, to change the aspect view point. Such interactions do not modify the geometric relation between the new scan and the previously acquired image planes, and are fed back into the graphics engine without affecting the geometry parameters within the scan geometry.

According to one aspect of the invention, a view generated by the 3-D graphics engine 270 can contain opaquely rendered model objects representing relevant portions of previously acquired slice planes, with the original image intensities (e.g., graylevel image intensities) displayed on the surface of these objects. In addition, the scan geometry can be modeled by opaque or preferably semi-transparent 3-D tile objects that show the location and extent of the operator's desired scan plane. Conventional 3-D hidden surface removal algorithms remove portions of slice planes of the far side of plane intersections relative to the virtual camera in the 3-D graphics system.

The computer graphics implemented by the 3-D graphics engine 270 can be generated by procedures for rendering 3-D scenes into 2-D projections on a computer display device, simulating a view through a virtual camera that is located in the 3-D scene and described by its own geometry parameters. The techniques used to this end in a preferred embodiment of the invention are commercially available for a variety of computer platforms (e.g., Open GL, MicroSoft Direct 3-D). The technique used for visualization of the intensity values of the reference views in a 3-D aspect view is known as texture-mapped surface rendering. Within the scope of the invention, the surface rendered is that of the plane depicting the location of the image in 3-D space (or 3-space). The texture map used in the invention in this procedure consists of the intensity map or maps associated with the reference views. As previously stated, to achieve the rendering performance required for viable interactive definition of scan geometry it may be required to utilize hardware to accelerate texture-mapped rendering. To accommodate clear viewing of the complete texture-mapped objects, the computer model used for simulation of the material properties and lighting conditions in the rendering process are preferably such that the reference image intensities are displayed with equal brightness regardless of the distance to the virtual camera in the rendering scene. In implementations that use depth shading, i.e., that use reduced light intensity far from the camera to simulate the presence of a light source near the camera, this is achieved by assigning light-emitting material properties to texture-mapped surfaces of objects in the 3-D scene.

The texture-mapped reference plane graphics are, in a preferred embodiment, generated to simulate opaque (non-transparent) objects. In contrast, the graphics depicting the new scan geometry before acquisition are preferably displayed in a semitransparent mode. This feature allows the observer to appreciate the intersection of the new scan with the reference planes, without obscuring the view of anatomy (or subject matter) that would be hidden behind the new scan plane if opaque visualization were used. Semi-transparent surface rendering may be achieved in a variety of manners, depending on the capabilities of the graphics rendering hardware. A sophisticated implementation may modulate the color of each point in the objects visualized behind the transparent object, resembling true optical transparent properties. Less capable hardware and/or software, on the other hand, may visualize the semi-transparent object by showing its color in a mesh pattern, while between mesh points the objects behind are shown. This approach resembles physical properties of a semi-transparent screen. If any of the reference images are from a dynamic, i.e., time-resolved, study, this quality may be visualized by generating a model of each temporal frame of this study in its proper geometry, and switching between the temporal frames in cyclic or continuous mode.

Figure 5:
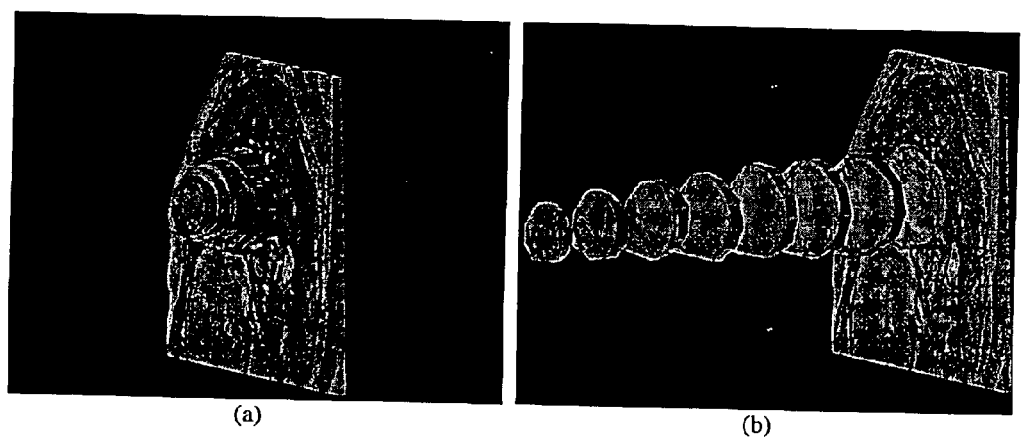
FIG. 5 shows an accordion mode for simultaneous viewing of multiple slices from a single multi-slice stack, according to one aspect of the present invention.

Continuing with the illustrative example of the present invention implemented using an MRI imaging device for imaging anatomy, it should be appreciated that image segmentation (i.e., delineation of the boundaries of anatomical structures of interest in the scene) is not required. According to one aspect of the invention, without any preprocessing efforts by the operator, the complete field of view or a predefined central portion of any image can be displayed, referred to herein as the imaging visualization technique. With minimal operator interaction a particular view may be enhanced by enabling the operator to rapidly edit a region to limit the visualized region in an image slice to contain only relevant anatomical structures. Such actions can avoid obscuring relevant regions in one slice by less relevant portions of another slice. This is illustrated in FIG. 5, described in greater detail below. However, if accurate anatomical boundaries of relevant anatomy are available, they can be used to provide additional visual cues to enhance the rendering. This can be realized either by addition of boundary surface models into the rendered view or by limiting the rendered slice regions to areas inside a region of interest (ROI).

It should be appreciated that the imaging visualization technique of the present invention does not require any specific requirements for image data, other than spatial co-registration of all images that are to be visualized together in the same view. Therefore, for example, the visualization technique of the present invention offers 3-D viewing of any images acquired in the same study (e.g., MRI study), for which most MRI scanners (imaging devices) provide co-registration parameters.

Figure 3:
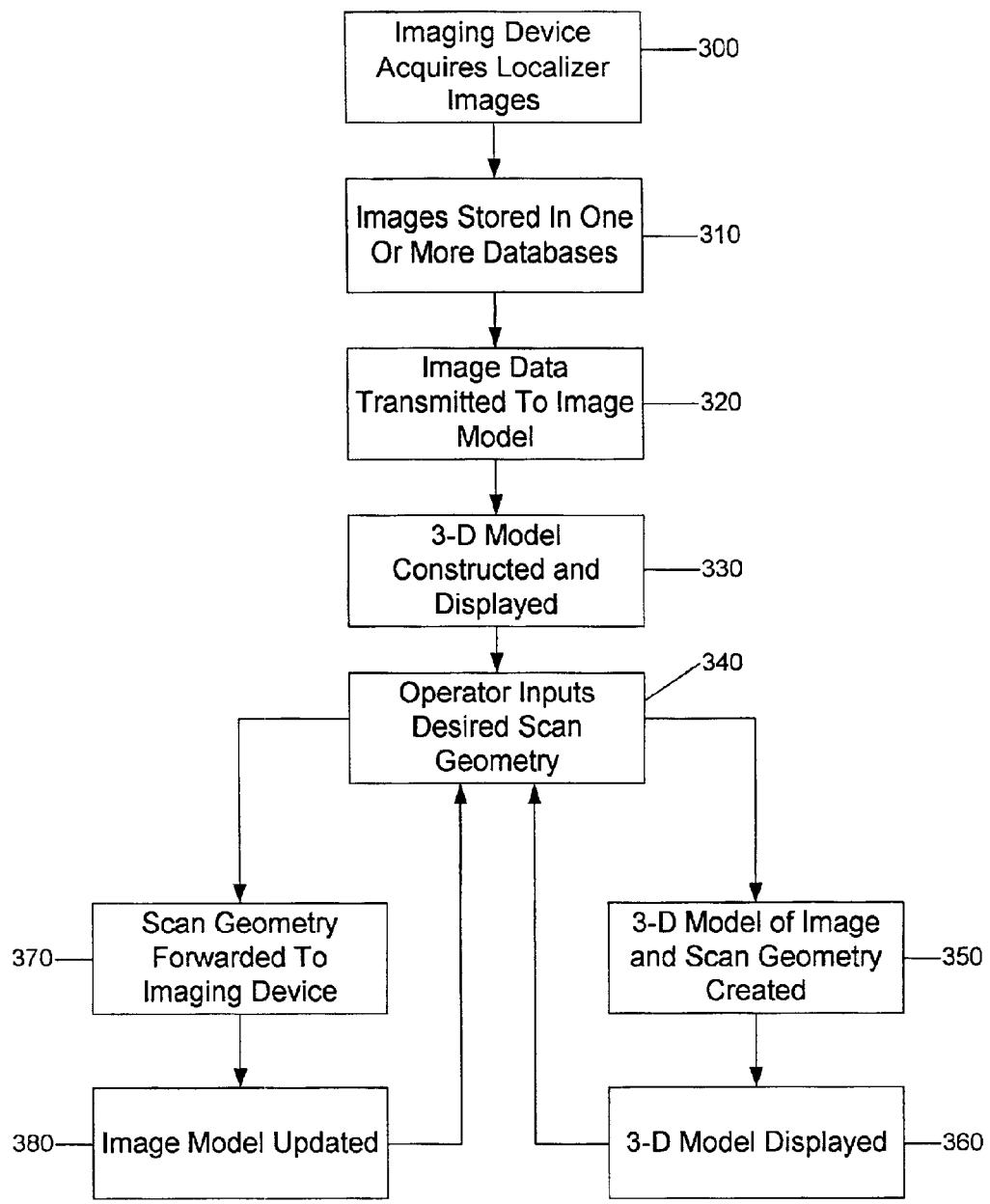
FIG. 3 shows a flowchart of a 3-D rendering method performed by the ISGD system illustrated in FIG. 2, according to one aspect of the present invention.

FIG. 3 shows a flowchart of a 3-D rendering method performed by the ISGD system 200 of FIG. 2, according to one aspect of the present invention. According to one aspect of the invention, an imaging device rapidly acquires a limited number of localizer images having a predetermined sub-optimal geometry at the beginning of the study (block 300). These images are stored as image data (block 310) in one or more conventional databases either local to the hardware of the present invention, or local to the imaging device. Next, the image data is transmitted to the subject model (block 320) located within the 3-D Model device of the present invention. Both the 3-D Model device and subject model are in communication with the imaging device and the one or more databases storing image data. As illustrated in the flowchart, a 3-D model is then constructed based upon these localizer images and displayed to the operator (block 330).

It should be appreciated that the method of the present invention is circular in nature, but for the acquisition of localizer images. Thus, the method and apparatus of the present invention include the use of a user feedback loop. The localizer images are generated based upon predetermined geometry, as stated above, rather than interactive operator input during the imaging of the object. However, based upon these initial localizer images, an operator can control the imaging device to define future images or slices generated by the imaging device. Thus, according to one aspect of the invention, after the localizer images are generated and displayed to the operator, the acquisition of further image data from the imaging device can be dependent upon scan geometry parameters based upon inputs received from an operator using one or more input devices (block 340). The scan geometry parameters are received by the ISGD system 200 and forwarded to both the 3-D Model device (block 350) and imaging device (block 370) to identify the operator desired scan.

The scan geometry parameters are transmitted to the scan model (block 350) located within the 3-D Model device to generate a 3-D model including both the image and scan objects produced by the 3-D graphics engine. The 3-D graphics engine represents the anatomy and scan geometry on a display (block 360) so that the operator can interactively modify the orientation of a desired scan geometry, which is typically a plane. Once this occurs, the operator is again queried to alter the scan geometry of the next scan (block 340). It should be appreciated that the imaging device simultaneously receives the scan geometry parameters when the parameters are transmitted to the scan model (block 370). The imaging device then utilizes these parameters to generate the operator-defined scan, and forwards the newly generated image data to the subject model of the 3-D Model device, thereby updating the 3-D model for display to the viewer (block 380).

According to one aspect of the invention, the operator will be required to affirm that the scan geometry parameters are correct before the imaging device actually generates a desired scan. Additionally, there may be one or more delay devices located between the scan geometry, imaging device, and 3-D Model device, such that generation of the 3-D scan model and newly acquired image are synchronized. According to one aspect of the invention, the user interacts with a previously acquired image, manipulates a scan model, where the manipulation is displayed, and the user affirms the desired scan, which is then updated in the 3-D model to become the next previously acquired image, and the process repeats itself. Further, although it should be appreciated that this process can occur real-time while the imaging device consecutively retrieves image data (e.g., during generation of image data), this process can also generate operator defined images where the image data is preaquired and stored in one or more databases.

Figure 4:
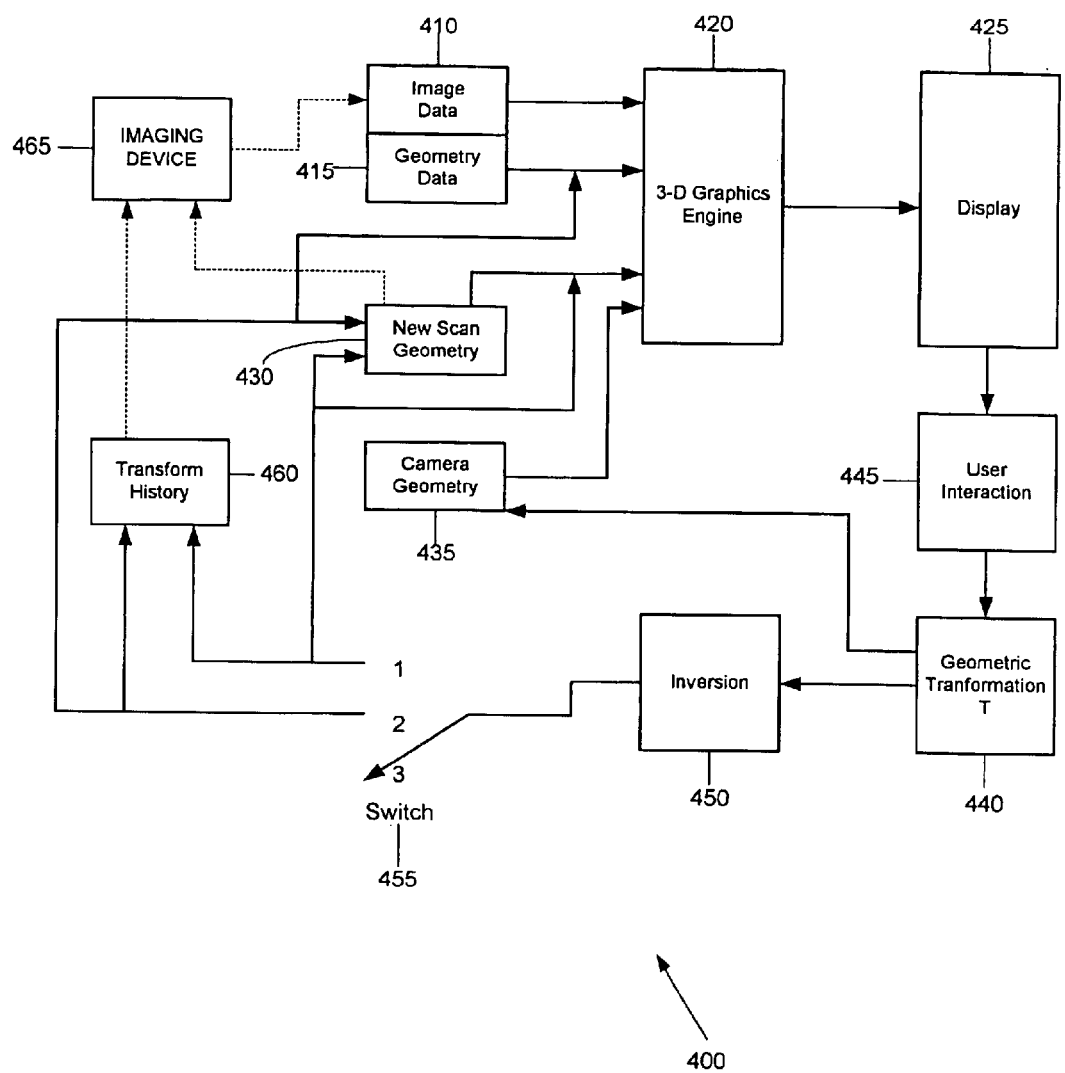
FIG. 4 illustrates a block diagram of an interactive scan geometry definition (ISGD) system of the present invention, according to another aspect of the present invention.

FIG. 4 illustrates a block diagram of an interactive scan geometry definition (ISGD) system of the present invention, according to another aspect of the present invention. It will be appreciated that the block diagram illustrated in FIG. 4 accomplishes the primary functions of the system illustrated in FIG. 2. FIG. 4 shows a ISGD System 400 including a graphics engine 420 that processes image data 410 and geometry data 415 into textured computer graphics for presentation on a display 425 in a 3-D aspect view. The geometry data 415 and image data 410 represent preexisting tomographic views used by the invention for visual reference of anatomy to be imaged. The geometry data parameters describe the geometry of pre-existing views, augmented with an array of numbers, and image data 410, representing the intensity values across the tomographic section as measured or computed.

In the same displayed presentation, parameter settings of new scan geometry 430 are processed into additional graphics depicting the new image before acquisition as a semi-transparent plane. The new scan geometry parameters 430 describe the location, orientation, pixel size, and extent of the image data set. The camera geometry 435 of a virtual camera defining the projection the rendered 3-D aspect view is modified by a geometric transformation 440 reflecting user (operator) interaction 445 with the 3-D view by an input device, such as a mouse, keyboard or the like. The operator may fix the geometry of either reference image graphics 415 or new scan geometry 430 to the camera by updating it using an inversion 450 of the transformation 440 defined by the camera movement, as will be appreciated by one of ordinary skill in the art.

A switch 455 is utilized to control the forwarding of the inverted camera movement information to the remaining components of the ISGD System 400. When in the switch 455 is in the first position, the inverted camera movement is forwarded to the new scan geometry 430 by which the new scan plane graphics are rendered, in which case the graphic will remain in the same position in the 3-D view. Alternatively, where the switch is in the second position, the inversion information may be processed into the geometry by which the reference plane graphics are rendered, in which case these graphics remain in the same location relative to the camera. When the switch is in the third location, the inverted transformation may be discarded, in which case operator interaction only moves the camera, and does not change the new scan geometry 130 at all. This enables the operator to manipulate the scan geometry without effecting a new image acquisition by the imaging device 465.

It should be appreciated that new scan geometry is at any time completely defined by the new scan geometry parameters 430 and the stored history of transformation parameters 460. This information is fed to the imaging device 465 to generate new imaging data when desired. Interactive modification of the new scan geometry parameters 430 is achieved by any convenient mechanisms allowed by the imaging device. In an embodiment of the invention for MRI, this occurs through interaction with input devices associated with the computer display. Examples include a keyboard, mouse pointer, trackball pointer, pen pointer device, keyboard, and the like. Additionally, the input device can include special-purpose equivalents specifically designed for interaction with 3-D rendered scenes.

According to one aspect of the invention, the operator can have an option to freeze the geometric relation between a desired scan object and the reference anatomy, in order to interact with the scene to modify the camera location or other scene properties, while maintaining the values of the new scan geometry. Once the desired view is obtained, the operator switches to a mode in which interaction with the scene results in modification of the new scan geometry, until the new scan geometry has the desired values as reflected by the visualization on the computer screen. Such interaction may be embodied by fixing the geometry of the reference view(s) in the scene to the camera view, while allowing modification of the view on the new scan, or vice versa. In either case geometrical transformations associated with the operator interaction may be processed into modifications of the new scan geometry.

Use of this technology with an imaging device with real-time acquisition capabilities, such as newer MRI scanners, may involve an implementation in which at all times an image, associated with the new scan geometry, is displayed on the display along with the interactive 3-D scene, and updated continuously. If computer hardware and/or software implementing the present invention is capable of generating the texture-mapped view in the 3-D scene sufficiently fast, this continuous image update may optionally also be incorporated as an additional texture-mapped graphic into the 3-D view. Upon viewing, the operator may decide that an image is of use as an additional reference view in the 3-D scene, and update the view contents to include the image, and optionally delete one or more older reference images from the 3-D view content.

Alternatives to the implementation described above may exist on several levels. First, the operator interaction mechanisms employed to modify the new scan geometry may vary between applications involving different imaging modalities. In particular, ultrasound imaging, where the scan plane in current technology is usually determined by the location of a hand-held transducer probe, manual positioning of this probe will replace the operator/computer interactions in the 3-D scene related to modification of camera geometry. It is noted, however, that an ultrasound imager must be equipped with a transducer positioning sensor system as described in U.S. Pat. No. 5,608,849 to Donald King, Jr., which provides the imager with scan plane geometry information, to be used in the present invention. Additional embodiments of the invention may exist in any application that involves definition of tomographic slices through volume objects, in which the plane definition is assisted by referencing existing views through the volume. Furthermore, the application field may extend beyond application in medical imaging.

According to one aspect of the invention, the IGDS system of the present invention features the availability of hardware-accelerated 2-D texture-mapped 3-D polygon model rendering. This is advantageous because software implementation of texture mapping may not be sufficient to deliver image quality with interactive performance utilizing conventional processor platforms. The visualization procedure accepts one or more time series of parallel image stacks as input, typically with 16-bit integer representation of voxel values. The visualization procedure has two primary stages, model construction and interactive rendering.

Model construction is a pre-processing step in which a basic algorithm is executed, performing three primary steps. First, the input image is limited to the regions that will be included in the visualization. If this step is omitted altogether, the complete image will be shown. Alternatively, one or more rectangular, circular, or irregularly shaped regions may be generated interactively, or, automatically. Smaller regions reduce the extent to which a particular slice may obscure other slice images in the 3-D view, but also limit anatomical context information. In many cases a useful compromise for display of a single image stack is visualization of the whole body in the first or last slice of a stack for anatomical reference, while the other images may be reduced to a region around the heart, as illustrated in FIG. 5, discussed in detail below.

Second, construction of a polygon surface model of the slice region for each image is completed. In its most elementary form, the surface model may be a rectangle with four corner vertices representing the corners of the field of view of a single image. Such a model would result if the whole image were shown as an infinitely thin plate object without any model decorations. Additional model features, such as simulated slice thickness or region border frames, can add enhanced visual cues to assist in the interpretation of the 3-D view, possibly at a cost in rendering performance due to the added model complexity. Third, mapping of the image intensity values onto the image slice surface model as surface texture is completed. The surface model is constructed to represent the location of an image slice in 3-D space. The relevant information from the image is added by painting the image intensity values onto the surface model. Conventional surface rendering algorithms can assign a single color to each elementary (triangular) surface element of a complex model, or, to accommodate color gradients across a surface, interpolate color values assigned to each polygon corner point. Texture mapping technology is a mapping mechanism for adding surface color information at a higher level of detail. A texture-mapping algorithm computes and index into an array of texture color values to calculate the color at each given point of a textured polygon during rendering. Graylevel image intensities may be used as texture maps for the MRI slice surfaces. In order to incorporate operator preferences for graylevel viewing, window/level intensity mapping may be applied before texture maps are created.

There are multiple features of importance for high-quality textured rendering of MRI and CMRI. First, the highest texture quality settings with adequate to excellent rendering performance are preferred. High texture quality settings translate into linear interpolation of texture values and a high dynamic range in rendered texture colors. Second, in standard Gouraud or Phong shading algorithms the amount of light reflected off a polygon towards a virtual camera depends on the angle between the polygon and the view point normal to the camera. This effect usually enhances depth perception in a 3-D view. But for 3-D display of graylevel MRI it is much more effective to keep the graylevels constant at any viewing angle. This can be achieved by assigning ruminant material properties to the graylevel-textured object surfaces. Such a model renders these surfaces to look like virtual light boxes, emitting light of constant intensity, attenuated by the texture maps.

Additionally, it should be appreciated that operator interactions to navigate a virtual camera in a 3-D scene should be made intuitive and simple. This can be implemented using off the shelf software, such as OpenInventor Examiner Viewer program. The operator should have three basic degrees of freedom in camera movement through the scene: (1) rotating around a center point in the scene, (2) moving the camera in viewing plane directions, and (3) moving the camera in and out of the scene along the viewing plane normal directions. Although internally these operator interactions control movement of the camera, these interactions are designed such that the operator feels as if he is rotating and moving the objects in the scene in an intuitive manner. Additionally, the operator has control panels to switch and control display of the image slice objects and to control cine display timing.

FIG. 5 shows an accordion mode for simultaneous viewing of multiple slices from a single multi-slice stack, according to one aspect of the present invention. As shown in the figure, the operator can utilize one or more controls, via the operator input device, to limit the matter the operator wishes to view in the accordion mode. It should be appreciated that an accordion mode of the entire structure would result in obstruction of relevant portions the operator wishes to view. The short-axis stack renderings shown in the figure model the slice thickness of acquisition, where (a) shows the geometrically correct aspect ratio obscuring much of the relevant slice regions. The operator can increase the spacing to modify the view to show all relevant image portions, while retaining contextual cues inherent in the 3-D rendering, as shown in (b).

Figure 6:
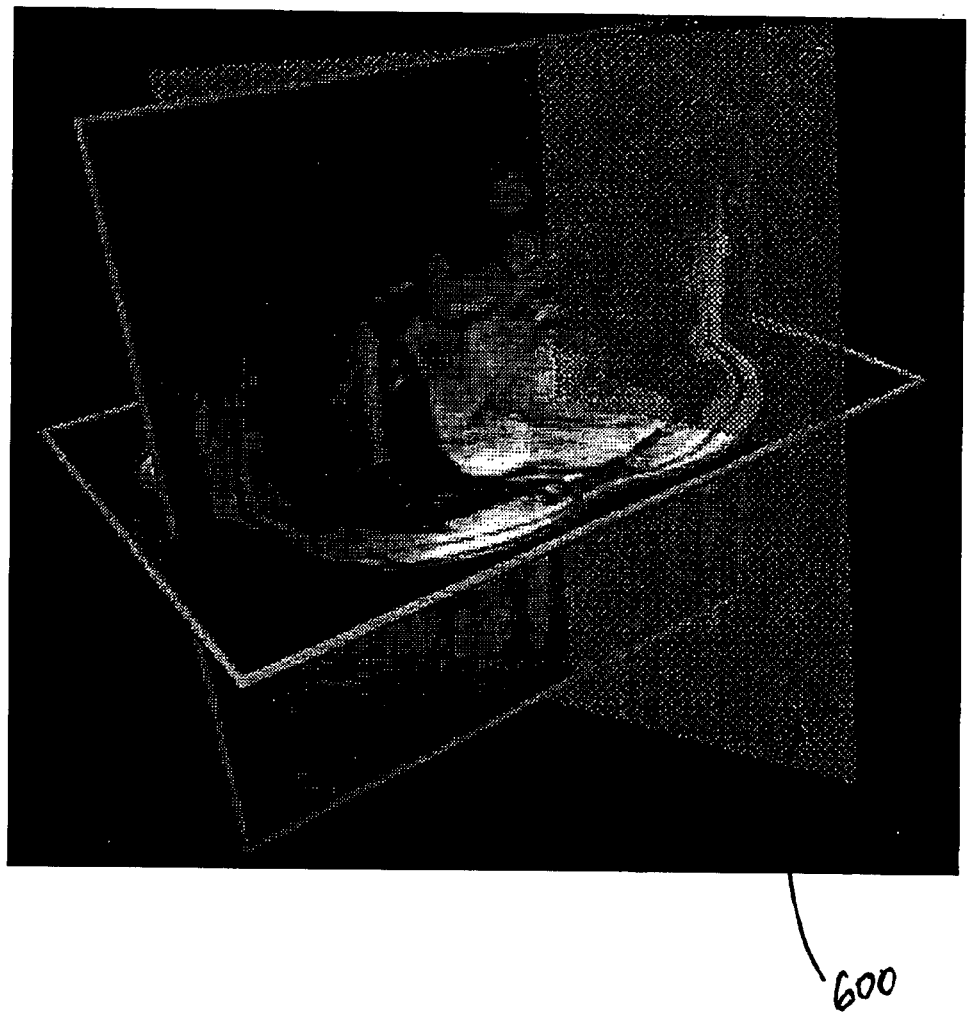
FIG. 6 shows an illustration of a plane definition, according to one aspect of the present invention.

FIG. 6 shows an illustration of a plane definition, according to one aspect of the present invention. Existing reference images in transaxial and coronal orientations are shown with their original in 3-D perspective context. The geometry of the new image 600 (illustrated as the lightest plane in FIG. 6) is defined through interactive manipulation of additional graphics to align with desired landmarks. The scene shows the definition of a vertical plane through the long axis of the heart.

Figure 7:
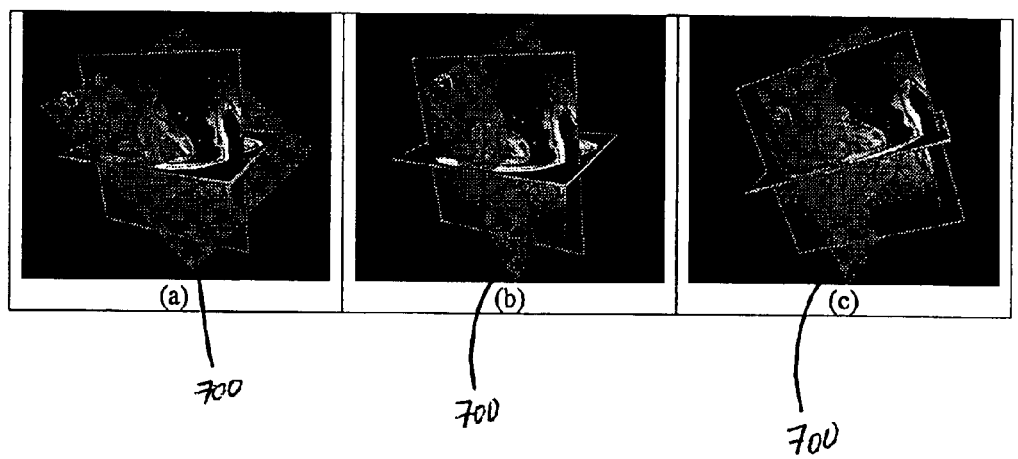
FIG. 7 shows various interaction modes for modification of the new scan geometry, as visualized by a semi-transparent plane graphic, according to one aspect of the invention.

FIG. 7 shows various interaction modes for modification of the new scan geometry 700, as visualized by a semi-transparent plane graphic. Relative to an existing situation (a) the operator may modify the new scan geometry by moving or rotating the new scan relative to the camera view, as shown by the change from (a) to (b). Alternatively, the new scan geometry may be fixed to the camera, in which situation the operator modifies the geometry by moving or rotating the display of the reference images, as shown by the changes from (b) to (c). In both cases the internal changes in transformation definitions are processed into changes in the new scan geometry definition.

According to the present invention, almost immediate 3-D viewing is enabled, requiring minimal or no operator-processing. Integration of this technology into imaging systems such as MRI viewing/analysis workstations may reduce the total time required to review studies, and facilitates interpretation by presenting the combined functional and 3-D data in a single view. Importantly, use of this technology also allows easy communication and demonstration of results, such as to referring physicians. The 3-D display offers a valuable convenience tool that can show in a fast and intuitive fashion structures and dynamics. Additionally, the accordion viewing mode is useful, as it accommodates displaying all slices of a multi-slice study (e.g., a short-axis study) with increased slice spacing to allow simultaneous viewing of the complete structure without obscuring one slice by another, while preserving 3-D context in the view.

The present invention also allows a number of images to be viewed on a single screen while also offering a realistic dynamic 3-D anatomical perspective and showing the inter-relationships between neighboring slices in natural fashion. Furthermore, the present invention can be applied with or without the use of high-quality image segmentation results. While current high-quality segmentation cannot be easily obtained without substantial operator efforts, the present invention can be applied using fast interactive or automated techniques. For example, where the present invention is utilized to generate a 3-D display of a heart, the operator can draw a circle around the heart in each slice, and only the area inside the circle is displayed. On the other hand, in cases where high-quality myocardial boundaries are available, such information can be incorporated in a natural fashion in the 3-D view to further enhance its information content. This situation may occur in cases where detailed assessment of regional wall motion is indicated, for which myocardial boundary information is required. Moreover, the present invention, by simply displaying all available slices individually, avoids the need for interpolation or other operations that may compromise data integrity to achieve cosmetically acceptable visualization.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the invention as disclosed herein. Although specific terms are employed herein, they are used in a generic and descriptive sense only and not for purposes of limitation.

What is claimed is:

1. An apparatus for facilitating the display and visually driven definition of tomographic image planes of a subject in three-dimensional (3-D) space, comprising:
    an imaging device for acquiring one or more plane images of the subject;
    a 3-D model device, in communication with the imaging device, for generating a 3-D model based upon the one or more plane images acquired from the imaging device;
    an input device for receiving operator input, wherein the operator input defines a pre-acquisition operator defined plane in addition to said one or more plane images acquired from the imaging device, and wherein a pre-acquisition scan model of the operator defined plane is incorporated into the 3-D model, and
    a display for presenting the 3-D model, wherein the 3-D model includes the operator defined plane, such that the operator can define an orientation of the operator defined plane in relation to one or more subject landmarks defined by the plane images acquired from the imaging device.

2. The apparatus of claim 1, further comprising a scan geometry module that communicates with the input device to receive the operator input, wherein the scan geometry module generates scan geometry parameters representative of the operator input and communicates the scan geometry parameters to the imaging device such that the imaging device can acquire the operator defined plane.

3. The apparatus of claim 2, wherein the 3-D model device updates the 3-D model to include the acquired operator defined plane.

4. The apparatus of claim 3, wherein the input device enables the operator to define a new operator defined plane after the 3-D model has been updated to include the previously acquired operator defined plane.

5. The apparatus of claim 2, wherein the 3-D model device includes a scan model, for receiving the scan geometry parameters, and a subject model, for receiving image data from the imaging device.

6. The apparatus of claim 1, wherein the imaging device is selected from one of the group consisting of a magnetic resonance imaging (MRI) scanner and an ultrasound machine.

7. The apparatus of claim 1, wherein the input device enables the operator to alter the orientation of the operator defined plane in the 3-D model, such that the operator can interactively manipulate and view, via the display, the defined plane in the 3-D model to facilitate the determination of a desired operator defined plane.

8. A method for enabling the interactive modification of operator defined scan geometry in an imaging system, comprising:
    storing image planes, acquired from an imaging device, as image data;
    transmitting the image data to a 3 dimensional (3-D) model device, wherein the 3-D model device constructs a 3-D model based on at least a portion of the image data;
    displaying the 3-D model to an operator;
    enabling the operator to manipulate the 3-D model to define a pre-acquisition operator defined image in addition to the image planes acquired from the imaging device, wherein a pre-acquisition object representing the operator defined image is presented with the 3-D model, such that the operator can determine the orientation of the operator defined image in relation to the one or more image planes acquired from the imaging device; and
    defining scan geometry determined by the operator with respect to the 3-D model for the imaging device to acquire additional image data.

9. The method of claim 8, further comprising acquiring the operator defined image based upon inputs received from the operator.

10. The method of claim 9, further comprising updating the 3-D model to include the operator defined image.

11. The method of claim 10, further comprising querying the operator for input to enable the operator to define a new operator defined image to be generated.

12. The method of claim 8, further comprising allowing the operator to manipulate the updated 3-D model.

13. The method of claim 8, further comprising querying the operator for input to enable the operator to manipulate the object representing the operator defined image, such that the user can interactively manipulate the object representing the operator defined image in the 3-D model to facilitate the determination of a desired operator defined image.

14. A computer program product for use with a data processing system for facilitating the display and visually driven definition of tomographic image planes in three-dimensional (3-D) space, said computer program product comprising:
    a computer usable medium having computer-readable code means embodied in said medium, said computer-readable code means comprising:
        computer-readable code means for storing localizer images, acquired from an imaging device, as image data;
        computer-readable code means for constructing a 3-D model based on at least a portion of the image data;
        computer-readable code means for transmitting the 3-D model to a display for displaying the 3-D model to the operator;
        computer-readable code means for enabling the operator to manipulate the 3-D model to define a pre-acquisition operator defined image to be generated in addition to the localizer images acquired from the imagine device; and
        computer-readable code means for defining scan geometry determined by the operator with respect to the 3-D model for the imaging device to acquire additional image data.

15. The computer program product of claim 14, further comprising computer-readable code means for updating the 3-D model to include the operator defined image, acquired from the imaging device.

16. The computer program product of claim 15, further comprising computer-readable code means for querying the operator for input to enable the operator to manipulate the updated 3-D model.

17. The computer program product of claim 15, further comprising processing instructions for querying the operator for input to enable the operator to define a new operator defined image.

18. An apparatus for facilitating the display and visually driven definition of tomographic image planes of a subject in three-dimensional (3-D) space, comprising:
    an imaging device for acquiring one or more plane images of the subject;

a 3-D model device, in communication with the imaging device, for generating a 3-D model based upon the one or more plane images acquired from the imaging device;

an input device for receiving operator input, wherein the operator input defines an operator defined plane, and wherein a scan model of the operator defined plane is incorporated into the 3-D model;

a display for presenting the 3-D model, wherein the 3-D model includes the operator defined plane, such that the operator can define an orientation of the operator defined plane in relation to one or more subject landmarks defined by the plane images acquired from the imaging device; and a scan geometry module that communicates with the input device to receive the operator input, wherein the scan geometry module generates scan geometry parameters representative of the operator input and communicates the scan geometry parameters to imaging device such that the imaging device can acquire the operator defined plane.

19. The apparatus of claim 18, wherein the 3-D model device updates the 3-D model to include the acquired operator defined plane.

20. The apparatus of claim 19, wherein the input device enables the operator to define a new operator defined plane after the 3-D model has been updated to include the previously acquired operator defined plane.

21. The apparatus of claim 18, wherein the 3-D model device includes a scan model, for receiving the scan geometry parameters, and a subject model, for receiving image data from the imaging device.

* * * * *

UNITED STATES PATENT AND TRADEMARK OFFICE
CERTIFICATE OF CORRECTION

PATENT NO. : 6,898,302 B1
DATED : May 24, 2005
INVENTOR(S) : Brummer

Page 1 of 1

It is certified that error appears in the above-identified patent and that said Letters Patent is hereby corrected as shown below:

Column 1,
Line 16, insert the following paragraph:
-- FEDERALLY SPONSORED RESEARCH OR DEVELOPMENT
The research underlying this invention was supported in part with funds from the National Institute of Health, Grant No. LM06486. The United States Government may have an interest in the subject matter of this invention. --

Signed and Sealed this

Sixteenth Day of August, 2005

JON W. DUDAS
*Director of the United States Patent and Trademark Office*